US 6,550,503 B1

(12) United States Patent  
Bowman et al.

(10) Patent No.: US 6,550,503 B1
(45) Date of Patent: Apr. 22, 2003

(54) DRIVE-THROUGH DELIMBING GATE

(76) Inventors: George Bowman, 417 Main St., Weir, MS (US) 39772; Evo Walker, 109 Old Robinson Rd., Louisville, MS (US) 39339

( * ) Notice: Subject to any disclaimer, the term of this patent is extended or adjusted under 35 U.S.C. 154(b) by 0 days.

(21) Appl. No.: 10/200,114

(22) Filed: Jul. 23, 2002

(51) Int. Cl.[7] ............................................. A01G 23/095
(52) U.S. Cl. ..................................... 144/24.13; 144/343
(58) Field of Search ............................ 144/4.1, 24.13, 144/34.1, 335, 336, 338, 343

(56) References Cited

U.S. PATENT DOCUMENTS

| 3,805,858 | A | * | 4/1974 | Morin ...................... 144/24.13 |
| 3,868,981 | A | | 3/1975 | Nadeau |
| 4,067,367 | A | | 1/1978 | Adamson |
| 4,111,245 | A | * | 9/1978 | McCrary et al. ......... 144/24.13 |
| 4,147,190 | A | * | 4/1979 | Nadeau .................... 144/24.13 |
| 4,172,478 | A | | 10/1979 | Dakus |
| 4,335,766 | A | | 6/1982 | Davis et al. |
| 4,440,202 | A | | 4/1984 | Everett |
| 4,588,008 | A | | 5/1986 | Napper |
| 5,146,960 | A | | 9/1992 | Blakely |
| 5,927,358 | A | | 7/1999 | Elixson |
| 5,964,262 | A | | 10/1999 | Corley |
| 6,000,448 | A | | 12/1999 | Grant |
| 6,484,769 | B2 | * | 11/2002 | Seymour .................... 144/338 |
| 6,488,063 | B2 | * | 12/2002 | Seymour .................... 144/338 |

FOREIGN PATENT DOCUMENTS

| CA | 1083016 | 8/1980 |
| SE | 353391 | 3/1972 |

* cited by examiner

Primary Examiner—W. Donald Bray
(74) Attorney, Agent, or Firm—Richard C. Litman

(57) ABSTRACT

A tree delimbing system which utilizes a "drive-through" gate assembly having a plurality of pre-dimensioned apertures formed therein for removing tree limbs from tree trunks of various dimensions. Each aperture is dimensioned to selectively receive a plurality of tree trunks of varying diameters for subsequent limb removal. A single gate structure pivots from an upright (vertical) position to a lowered (horizontal) position upon impact with a skidder with attached felled trees. The impact of the skidder forces the gate down for tree transport therethrough. Once the trees have cleared the gate, a counter weight attached to the gate by cable returns the gate to its upright position. The trees are then rearwardly pushed through the apertures in the gate by the skidder to remove the limbs. The gate assembly forms an independent and stationary structure with anchors for securing the structure within surrounding terrain.

12 Claims, 5 Drawing Sheets

DRIVE-THROUGH DELIMBING GATE

BACKGROUND OF THE INVENTION

1. Field of the Invention

The present invention relates generally to tree harvesting. More specifically, the invention is a tree delimbing gate system which pivots to enable a loaded skidder or vehicle drive-through for subsequent tree delimbing.

2. Description of Related Art

Numerous tree delimbing structures have been devised to assist the skilled laborer in the field of tree harvesting. As described hereinbelow, most of the conventional delimbing structures used in the industry have served only to improve tree harvesting productivity, one tree at a time and/or the delimbing apparatus is so complex that it requires nearly a certification to operate. A drive-through delimbing gate which maximizes tree harvesting in mass production and reduces associative labor and other resource costs as herein described is lacking.

For example, U.S. Pat. No. 3,868,981 issued to Nadeau discloses an apparatus for delimbing felled trees which includes a fixed base and a pair of blade support bars pivotally connected thereto. Cutting blades are affixed to the blade supports such that when a tree or group of trees is pulled through the apparatus the cutter blades come into severing engagement with a respective tree limb at opposing sides thereby severing limbs respectively.

U.S. Pat. No. 4,067,367 issued to Adamson discloses a delimber apparatus which consists of a welded frame made of pipes. The frame stands upright on a base, so that fallen trees can be pulled through at least one square shaped opening or aperture disposed between the pipes of the frame. The frame is placed stationary via a series of spikes mounted to the base of the frame and inserted within the ground of a forest area or region where logging is taken place.

U.S. Pat. No. 4,172,478 issued to Dakus discloses a tree delimbing apparatus suitable for mounting on a vehicle. A frame bears a plurality of delimbing arms which are pivotally mounted and spring loaded on the frame. Each arm extends outwardly from the frame so as to engage the branches of felled trees. The trees are suitably oriented in parallel on the ground and then the vehicle bearing the delimbing apparatus passes over felled trees. The frame moves along the tree trunks and spring loaded delimbing arms are biased to accommodate varying diameters of tree trunks as the frame passes over the trunks. The delimbing arms are rigidly supported in the direction of motion and thus strip off the tree branches as the frame moves along the trunks.

U.S. Pat. No. 4,335,766 issued to Davis et al. discloses a delimbing gate apparatus for delimbing trees. The gate is chained to a pair of tree trunks for stabilization during tree branch delimbing. Trees are pushed top first through a grid work of apertures which expands and contracts to accommodate varying tree diameters. A similar grid-like cutter frame is disclosed in the U.S. Pat. No. 4,440,202 issued Everett, except the elements of the grid are substantially square and the frame is mounted to a stabilized platform. The trees or logs are loaded on the platform and conveyed through the cutter grid.

U.S. Pat. No. 4,588,008 issued to Napper discloses a delimbing apparatus which includes a frame having a platform with a central slot through which felled trees are processed for delimbing. The platform includes a pair of tires mounted at one end on an axle and a series of hand controls for manipulating the lowering and raising of an upper cutting bar. When the upper cutting bar is lowered, it is brought together with a lower cutting bar to form a series of cutting apertures between which trees are pulled and pushed to remove or cut all limbs.

U.S. Pat. No. 5,146,960 issued to Blakely discloses a tree delimbing structure comprising a plurality of biased gates arranged in parallel relationship with each other. Each gate is hingedly mounted at opposing ends of the platform and include aligned slots for receiving a single tree trunk for delimbing. The platform includes a row of spikes disposed on its bottom surface for anchoring the platform to the ground. A frontal surface is used to stabilize and oppose the force of rearwardly forcing a single tree trunk therethrough. One of the setbacks of this design is resultant deformation on the frame structure of the gate due to cyclical use and high impact forces associated with tree limb removal.

Other Patents issued and granted to Elix (U.S. Pat. No. 5,927,358), Corely (U.S. Pat. No. 5,964,262), Grant (U.S. Pat. No. 6,000,448), Lindblom (SE 343391) and Hagan (CA 1083016), respectively, disclose tree limb removing apparatus considered to be of general relevance to the drive-through delimbing gate as herein described. These general features are directed to utility vehicles for loading trees for limb removal.

None of the above inventions and patents, taken either singly or in combination, is seen to describe the instant invention as claimed.

SUMMARY OF THE INVENTION

The tree delimbing system according to the invention utilizes, a "drive-through" gate assembly having a plurality of pre-dimensioned apertures formed therein for removing tree limbs from tree trunks of various dimensions. Each aperture is dimensioned and configured to selectively receive a plurality of tree trunks of varying diameters for subsequent limb removal. A single gate structure pivots from an upright (vertical) position to a lowered (horizontal) position upon impact with a skidder with attached felled trees. The impact of the skidder forces the gate down for tree transport therethrough. Once the trees have cleared the gate, a counter weight attached to the gate by cable returns the gate to its upright position. The trees are then rearwardly pushed through the apertures in the gate by the skidder to remove the limbs. The gate assembly forms an independent and stationary structure with anchors for securing the structure within the surrounding terrain.

Accordingly, it is a principal object of the invention to provide a drive-through gate system for delimbing a plurality of trees.

It is another object of the invention to provide an independent drive-through delimber gate system which utilizes ground anchors for structural stability.

It is a further object of the invention to provide a drive-through delimber gate system which utilizes counter weight measure for restoring a single gate structure from a horizontal position to an upright or vertical position.

Still another object of the invention is to provide a drive-through delimbing gate system adapted for a plurality of tree trunks of various diameters and lengths.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed to a delimbing gate system which is easily deployed in the field where trees T are harvested or where logging takes place. The preferred embodiment of the present invention is depicted in FIGS. 1–5, and is generally referenced by numeral 6.

Figure 1:
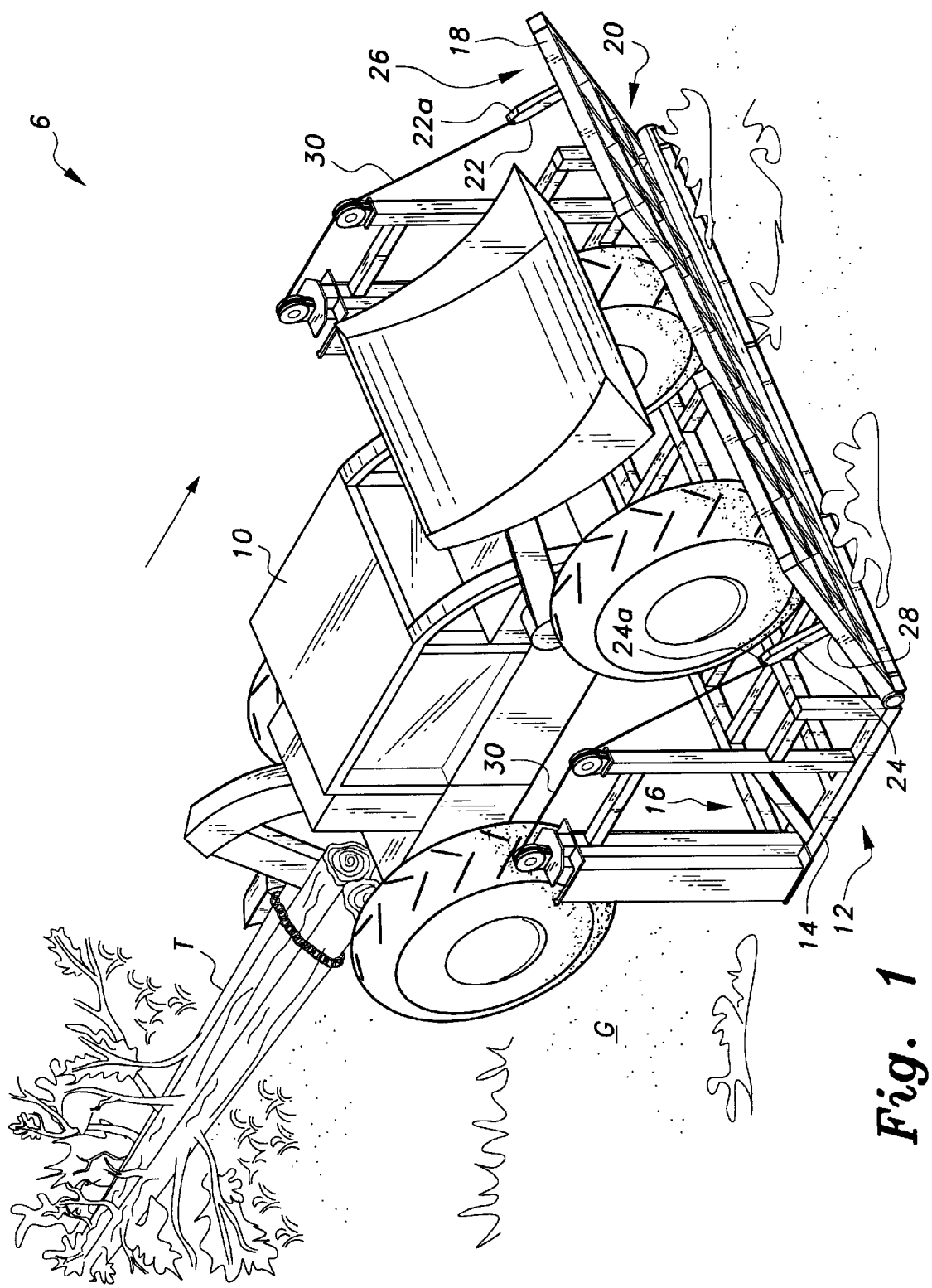
FIG. 1 is an environmental, perspective view of a drive-through delimbing gate system according to the present invention.

As best seen in FIG. 1, the delimbing gate system 6 is shown in combination with a skidder 10 with attached felled trees T. The delimbing gate system 6, includes a horizontally oriented, welded gate platform 12 having a front end, a rear end, and opposing sides, and having a base portion 14 and a top portion 16 for the attachment of auxiliary truss-like support structures, and a grid-like gate structure 18 having an upper end, a lower end and opposing sides and including a plurality of cutting apertures 20 varying in area disposed therein. The upper end of the gate structure 18 includes upper members 19 spaced endwise to form central upper gap 21. (see FIG. 2). The gate structure is preferably constructed of horizontal and vertical trusses of varied lengths welded together to form the cutting apertures 20 of varying area.

Figure 2:
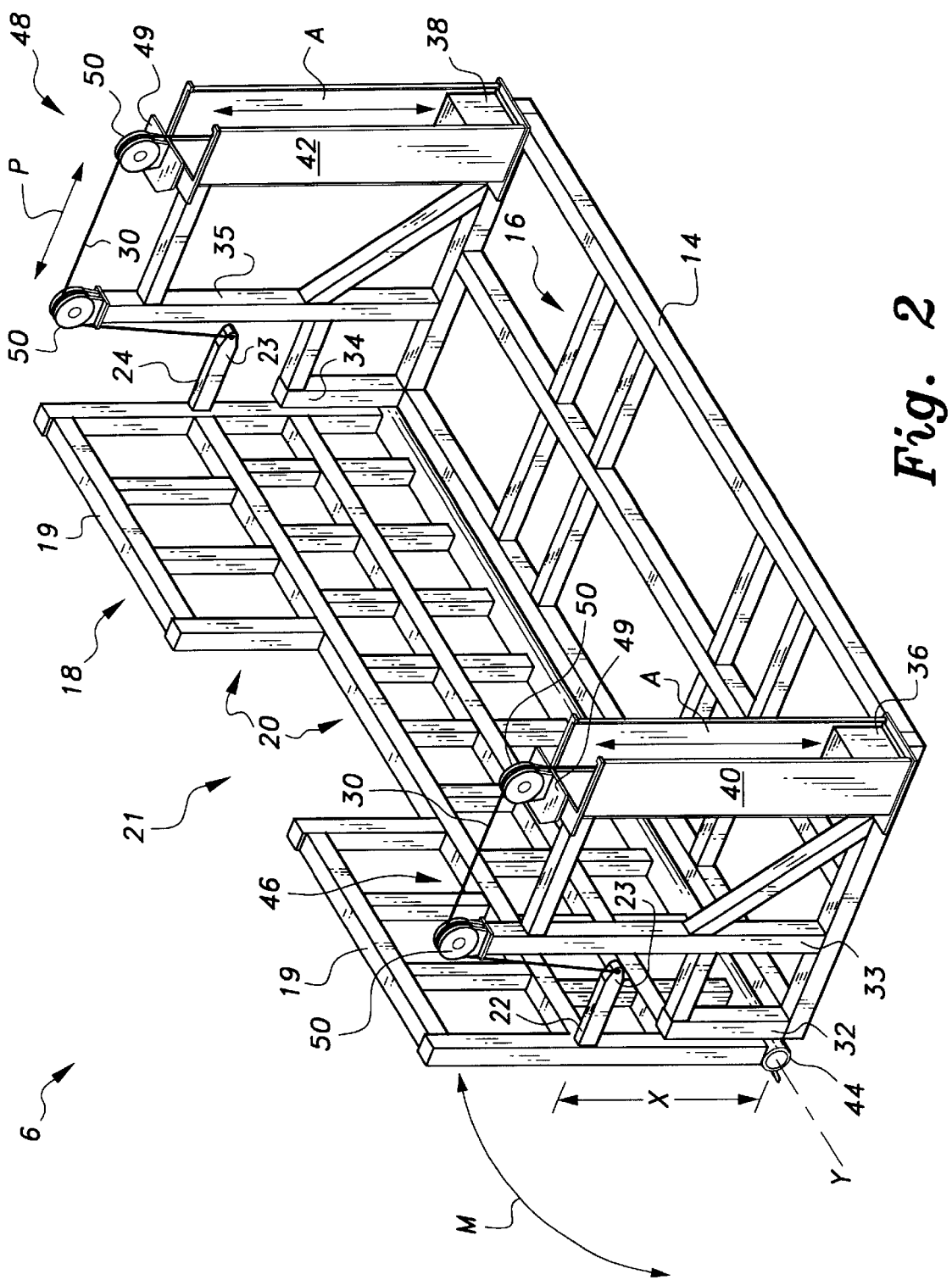
FIG. 2 is a perspective view of the drive-through delimbing gate system, illustrating a movable gate and pulley system.

The gate structure 18 further includes a first counterweight connector arm 22 and a second counterweight connector arm 24 which are disposed at opposing ends 26 and 28 of the gate structure 18 in parallel relationship, respectively. Each counterweight extension arm 22,24 is disposed perpendicular with respect to a surface portion of the gate structure 18 as protruding members 22,24. The free ends 22a and 24a of each respective extension arm 22,24 include at least one aperture 23 disposed therein for retaining at least one cable line 30 by conventional means (e.g., mechanical fasteners, U-clamps, etc.). In addition, each extension arm 22,24 has a moment arm X of equal length dimensions for generating a selective restoring moment M upon the gate structure, as illustrated in FIG. 2. The gate structure 18 is retained in an upright or substantially perpendicular position via first and second abutting truss-like structures 32 and 34, respectively.

The upper ends of truss-like structures 32 and 34 are spaced below first counterweight connector arm 22 and second connector arm 24, respectively, to allow gate structure 18 to assume a vertical position relative thereto.

As diagrammatically illustrated in FIG. 2, the drive-through delimbing gate system 6 is shown in perspective view as a single isolated structure. The moment M indicated therein is generated by reaction weights 36 and 38 which are of the same magnitude. The weights 36, 38 are constrained to move up and down as indicated by the direction arrows A, within first and second respective channels 40 and 42 when operatively and respectively attached to the extension arms 22,24 of the gate structure 18 via a cable lines 30. The magnitude of the weights are predetermined depending on the force required to overcome the weight of the gate 18 in accordance with Newton's Law.

As illustrated in FIG. 2, a rotatable pivot hinge 44 is shown for rotatably coupling the gate structure 18 relative to the gate platform 12. The gate platform 12 supports a first counterweight assembly 46 and a second counterweight assembly 48. Both assemblies 46,48 include a plurality of pulleys 50 co-linearly aligned along at least one path P, and mounted on vertical members to a portion of the platform 12. At least one of the pulleys 50 in both respective assemblies 46 and 48 is mounted to a top structure 49 mounted over the gate-facing portion of the respective channels 40 and 42. The remaining pulleys are mounted to the upper end of vertical members 33,35, respectively, top structures 49 acting as a limit to upper travel of reaction weights 36 and 38.

The cable line 30 is preferably steel cable, but can be made of any other material (e.g. aircraft cable), so long as the tensile strength of the cable 30 is well within the range characteristic of steel at least. The cable line 30 is primarily used to couple the respective first and second counterweight extension arms 22,24 to the respective first and second counterweight assemblies 46,48. The cables 30 are in continuous contact with the gate structure via the first and second counterweights coupled connections of the assemblies 46,48 over a predetermined range of motion of the gate structure 18. This range of motion is determined with respect to a central axis Y formed with the first coupling means 44. The rotatable pivot hinge 44 is preferably a rotating hinge or pivot hinge tube 44 that turns inside a pivot bushing. The pivot hinge tube 44 is configured to extend substantially along the width of both the gate structure 18 and the width of the base portion 14 of the platform 12 as an operative hinge therebetween.

The first and second slidable channels are substantially U-shaped channels 40 and 42, with predetermined lengths. The lengths of the channels are selectively determined depending on the size of the gate structure 18 directed to maximizing the delimbing rate of felled trees per pass through the gate system 6.

Figure 3:
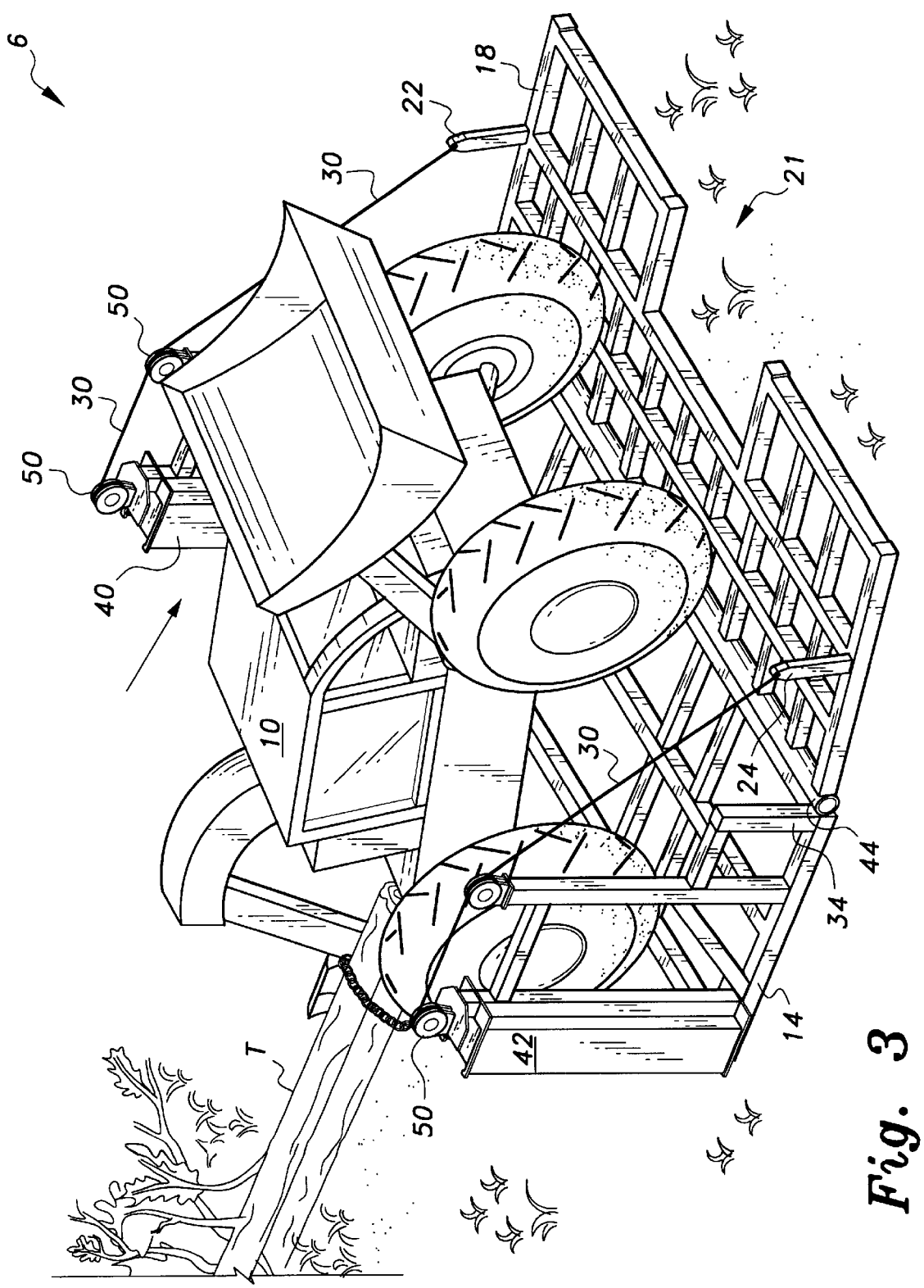
FIG. 3 is a perspective view of the drive-through delimbing gate system, illustrating a drive-through mode according to the invention.
Figure 4:
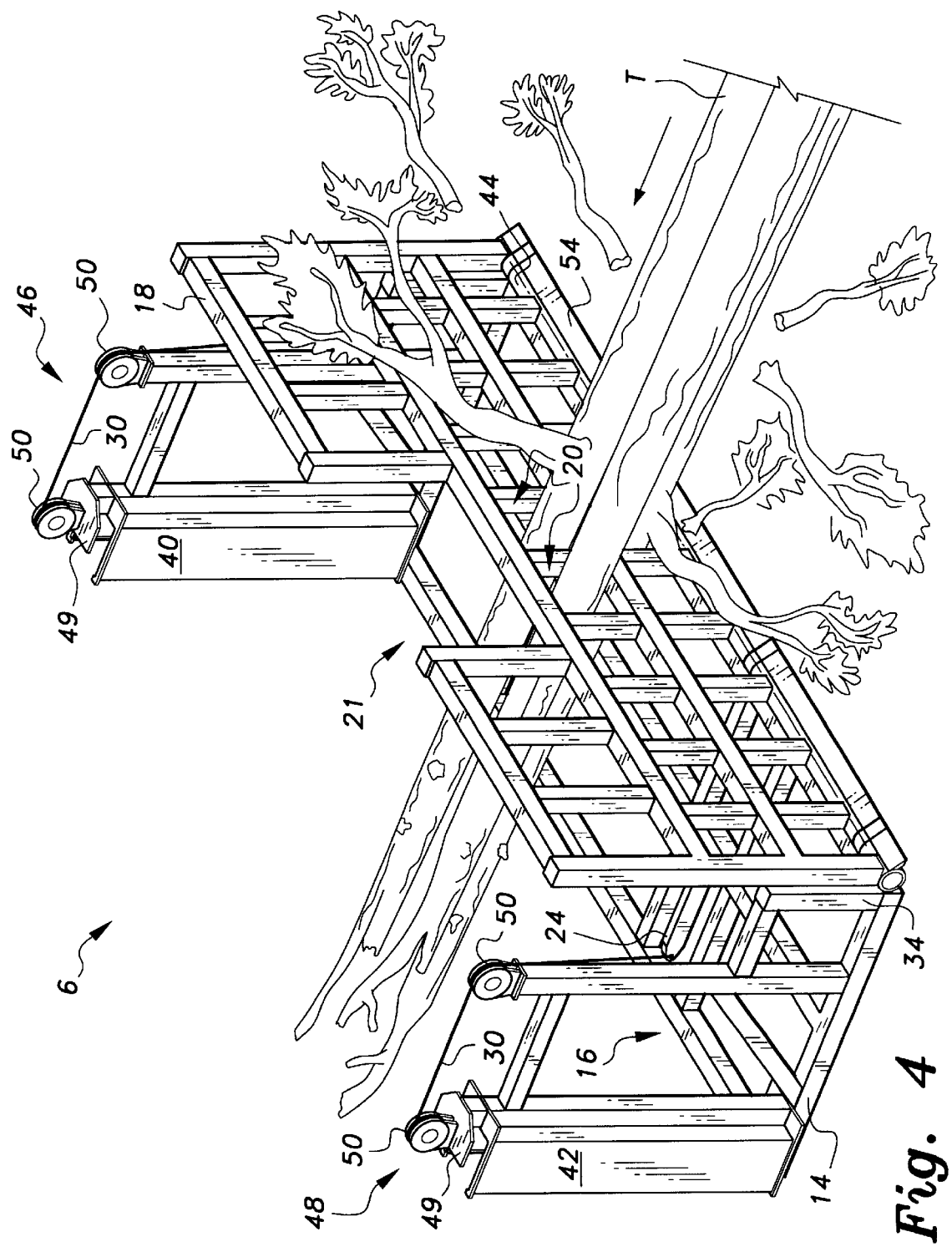
FIG. 4 is a perspective view of the drive-through delimbing gate system, illustrating tree limb removal.

FIG. 3 diagrammatically illustrates a single pass of a skidder 10 with a plurality of felled trees T attached. In operation, the gate structure 18 upon initial impact with and with substantially continuous force by the skidder 10 is lowered from an upright (perpendicular) position to a lower (substantially horizontal) or ground position until the load carrying skidder 10 has completely passed over the gate structure 18. When this occurs, the counterweight assemblies act to restore the gate 18 by the force of gravity to its original upright position in preparation for delimbing of the passed load of trees T. Once the skidder 10 is past the gate structure, and as gate 18 closes, the trees T are pulled through central upper gap 21, thus aligning the trees in the center of the gate. Once the trees are pulled clear of gate 18, the aligned trees are easily directed back through the now perpendicular apertures. This is accomplished by operating the skidder 10 to rearwardly force the load of trees T through the pre-sized apertures as diagrammatically illustrated in FIG. 4.

Figure 5:
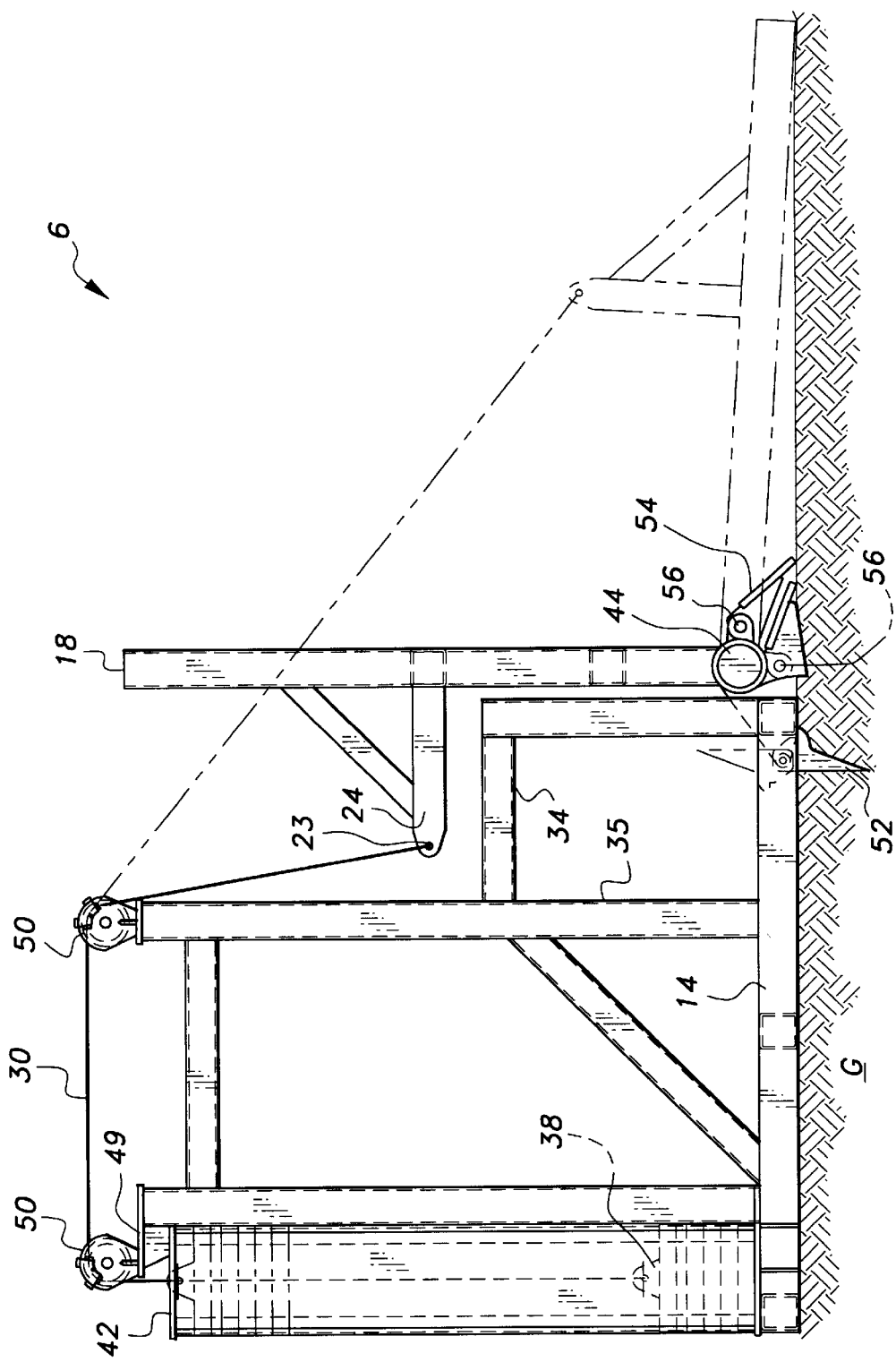
FIG. 5 is a perspective side view of the drive-through delimbing gate system, illustrating a lowered gate configuration according to the invention.

As diagrammatically illustrated in FIG. 5, the delimbing gate system 6 is shown in a side perspective view to illustrate the utilization of a ground anchor 52 for stabilizing the delimbing system 6 during multiple passes by a loaded skidder 10. A plurality of such anchors 52 can be rotatably mounted to selective bottom portions of the base 14 for increased stabilization of the system 6. The anchor depths (and respective lengths) can vary depending on the loading capacities of the amount of trees T for delimbing in order to counteract the rearward force generated within the gate system 6 by the loaded skidder 10.

Also shown in FIG. 5 is the utilization of limb and tree deflector 54. As seen therein, the deflector 54 pivots on pins 56 and folds under the gate 18 (phantom lines) when the gate structure 18 is pushed to the ground G. The deflector 54 serves to keep tree trunks and limbs from being forced under the delimbing gate 18 and platform 12 during the delimbing process.

Accordingly, it is imperative that at least the gate platform 12, anchors 52 and the gate structure 18 be made of durable material, such as steel or similar material. Such material should be impervious to moisture laden effects such as rust, corrosion and the like, and be constructed to prevent material fatigue due to cyclical stress failure.

Other unobvious advantages of the tree delimbing gate system according to the invention include wherein the amount of labor, utilization of land vehicles, fuel resources and other expenses are minimized via on-site delimbing. The invention replaces the conventional technique of having to load and transport the harvested trees to a remote delimbing location. The construction of the drive-through delimbing system is assembled via well known welding techniques. Since such techniques are considered to be well within the knowledge of one having ordinary skill in art to perform, such details are not discussed.

It is to be understood that the present invention is not limited to the sole embodiments described above, but encompasses any and all embodiments within the scope of the following claims.

We claim:

1. A delimbing gate system, comprising:
   a horizontally disposed gate platform having a base portion having a front end opposing sides and a rear end;
   a grid-like gate structure having a plurality of cutting apertures disposed therein, said gate structure having an upper end, opposing sides and a lower end attached therealong by a rotatable pivot hinge coupling said front end of said gate structure to said gate platform for rotation of said gate structure from an open horizontal position to a closed vertical position;
   first and second counterweight connector arms extended rearward from each said gate opposing sides at points intermediate said upper end and said lower end;
   said gate platform having a first counterweight assembly and a second counterweight assembly vertically attached thereto; and
   a connector for coupling each said respective first and second counterweight connector arms to said respective first and second counterweight assemblies, the said connector being configured to provide continuous contact with said gate structure via said first and second counterweight coupled connections over a predetermined range of motion of the gate structure, such that said gate motion is made with respect to an axis formed with said rotatable pivot hinge.

2. The delimbing gate system according to claim 1, wherein each said first and second counterweight assemblies comprise respective first and second predetermined weights, a cable attached to said weight, and a respective plurality of pulleys for supporting said cables.

3. The delimbing gate system according to claim 2, said platform having a first and second slidable vertical channels mounted on said gate platform at opposing corners formed by said rear end and said opposing sides for slidably housing said first and second weights of predetermined magnitude therein.

4. The delimbing gate system according to claim 3, wherein said first and second slidable channels are substantially U-shaped channels opening rearwardly relative to said gate platform.

5. The delimbing gate system according to claim 4, further comprising an abutting truss-like structure mounted along each said gate platform opposing sides along a forward portion spaced from said front end thereof and extending upward therefrom to a point below said corresponding counterweight connecting arms when said gate is in a closed position.

6. The delimbing gate system according to claim 5, each said abutting truss-like structures having a rear vertical member extending upward therefrom.

7. The delimbing gate system according to claim 6, further comprising a top structure located on the top portion of each of said slidable channels, partially closing said slidable channels, said plurality of pulleys being attached to said top structure and said rear vertical member, whereby upon said gate being pushed to a horizontal position, said cables, as attached to said counterweight arms, are pulled over said pulleys which, in turn, raised said weights to an upper position relative to said U-shaped channels, and whereby upon said gate being released, said weights descend, pulling said cables over said pulleys and lifting said gate to a vertical position by means of said counterweight arms.

8. The delimbing gate system of claim 7, wherein said upper end of said gate structure includes has an upper members defining a central upper gap in said gate.

9. The delimbing gate system according to claim 1, wherein said gate system further comprises at least one anchor disposed at a bottom portion of the base portion of the gate platform for anchoring said platform to the ground.

10. The delimbing gate system according to claim 1, wherein at least said gate platform and said gate structure are made of steel truss structures.

11. The delimbing gate system according to claim 1, wherein said apertures in said gate structure vary in size.

12. The delimbing gate system according to claim 1, wherein the predetermined gate motion is defined wherein the gate structure is releasably lowered from an upright position to a ground position in response to a substantially continuous contact force.

* * * * *